(12) United States Patent
Hillis et al.

(10) Patent No.: US 8,890,870 B2
(45) Date of Patent: Nov. 18, 2014

(54) SYSTEM AND METHOD FOR VISUALIZING RELATIONSHIPS BETWEEN OBJECTS

(75) Inventors: W. Daniel Hillis, Encino, CA (US); Fred Graver, New York, NY (US)

(73) Assignee: Applied Minds, LLC, Glendale, CA (US)

( * ) Notice: Subject to any disclaimer, the term of this patent is extended or adjusted under 35 U.S.C. 154(b) by 1117 days.

(21) Appl. No.: 12/494,084

(22) Filed: Jun. 29, 2009

(65) Prior Publication Data

US 2009/0322758 A1 Dec. 31, 2009

Related U.S. Application Data

(60) Provisional application No. 61/076,599, filed on Jun. 27, 2008.

(51) Int. Cl.
*G06T 11/20* (2006.01)

(52) U.S. Cl.
CPC .................................. *G06T 11/206* (2013.01)
USPC ........................................................ 345/440

(58) Field of Classification Search
CPC .................................................... G06T 11/206
USPC ........................................................ 345/440
See application file for complete search history.

(56) References Cited

U.S. PATENT DOCUMENTS

| 5,450,535 | A | * | 9/1995 | North .............................. 345/440 |
| 5,515,487 | A | * | 5/1996 | Beaudet et al. ................ 345/440 |
| 7,672,856 | B1 | * | 3/2010 | Cahn ............................... 705/1.1 |
| 2005/0256887 | A1 | * | 11/2005 | Eiron et al. .................... 707/100 |
| 2012/0030193 | A1 | * | 2/2012 | Richberg et al. .............. 707/719 |

FOREIGN PATENT DOCUMENTS

WO WO-2006/118558 * 11/2006

OTHER PUBLICATIONS

Emden R. Gansner, Eleftherios Koutsofios, Stephen C. North, and Gem-Phong Vo, A Technique for Drawing Directed Graphs, Mar. 1993, IEEE Transactions on Software Engineering, vol. 19, No. 3, pp. 214-230.*

* cited by examiner

*Primary Examiner* — Jeffery A Brier

(74) *Attorney, Agent, or Firm* — Michael A. Glenn; Perkins Coie LLP

(57) ABSTRACT

A graphical user interface transforms objects into nodes and relationships that are shared between the objects into edges. The edges are labeled with the relationship types. Multiple edges are ordered automatically or manually. Multiple edges are collapsed onto a single line and labels applied to the single line for each collapsed edge. The labels applied to the single line are ordered along the line according to relationship type. When there are multiple types of relationships within the same class, each class is collapsed onto a single line and ordered accordingly. A user selects the objects that are displayed by the GUI. The user can add additional objects or relationships and filter the results.

8 Claims, 6 Drawing Sheets

SYSTEM AND METHOD FOR VISUALIZING RELATIONSHIPS BETWEEN OBJECTS

CROSS REFERENCE TO RELATED APPLICATIONS

This patent application claims the benefit of U.S. provisional patent application Ser. No. 61/076,599, Interactive Tool for Visualizing Ordered Relationships between Two or More Entities, filed Jun. 27, 2008, the entirety of which is incorporated herein by this reference thereto.

BACKGROUND OF THE INVENTION

1. Technical Field

This invention relates generally to the field of software applications for transforming data into graphical representations of relationships. More specifically, this invention relates to an interactive tool that arranges and orders relationships between entities.

2. Description of the Related Art

Many objects have complicated relationships to other objects. For example, a band makes music as a group, but then the individual members frequently produce solo albums. A diagram that illustrates the albums associated with the band and band members can be organized according to a hierarchical structure. If you add another relationship into the diagram, however, such as producers of the albums, the relationships become too complicated to represent in a hierarchy.

A graph can effectively represent the band albums, the individual solo albums, and producer relationships, but representing this information even on a graph becomes increasingly difficult to visualize as the number and density of the relationships increases. The resulting complexity of the networks of relationships quickly overwhelms human comprehension, which obscures important patterns and orderings within the relationships. While many interfaces for visualizing networks of relationships exist, they cannot readily reveal orderings of relationships that further clarify the connections between two objects.

SUMMARY OF THE INVENTION

A system generates a graphical user interface that depicts ordered relationships between two or more objects. In one embodiment, a graph is generated in which the objects are represented by nodes, and relationships between the objects are represented by labeled edges connecting the nodes. A single pair of nodes may be linked by multiple edges, corresponding to multiple relationships between the corresponding pair of objects. Multiple edges can be ordered automatically or as specified by a user. Where multiple edges correspond to a sequence of related events, in one embodiment, the edges are ordered chronologically. For simplicity of viewing and comprehension, in one embodiment, multiple edges within the same class are collapsed onto a single line and labeled according to the relationship type.

DETAILED DESCRIPTION OF THE INVENTION

System Architecture

Figure 1:
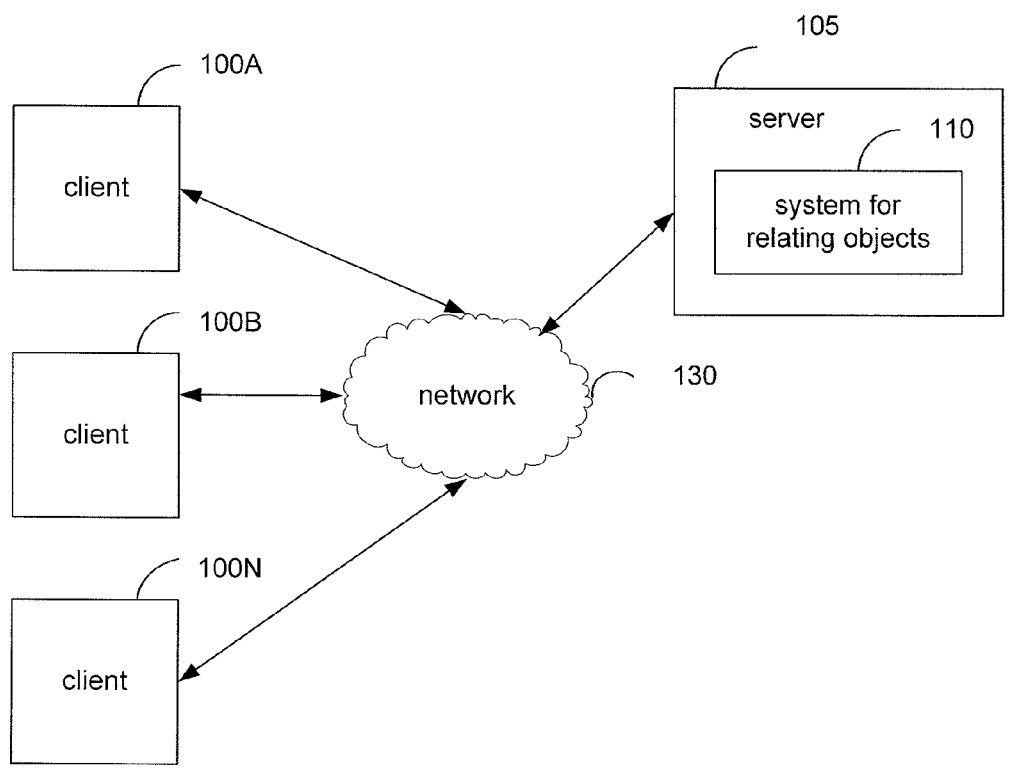
FIG. 1 is a block diagram that illustrates a network architecture in which systems and methods consistent with the principles of the invention may be implemented.

FIG. 1 is a block diagram that illustrates an exemplary network architecture in which a server 105 stores a system for relating objects 110 according to the invention. The system for relating objects 110 transforms data into a graphical user interface that is transmitted via the network 130 to multiple clients 100A, 100B, and 100N. In one embodiment, a client 100 comprises a computing platform configured to act as a client device, e.g. a computer, a digital media player, a personal digital assistant, etc. In FIG. 1, the system for relating objects 110 is illustrated as residing on a server 110. Clients 100 are able to access applications and/or data on the server 105 using, for example, a web browser or other client software (not shown). It is to be understood that this is an example only, and in various embodiments this system 110 can be instantiated on a client 100, a server 110, or distributed between multiple clients 100 and/or servers 110.

Figure 2:
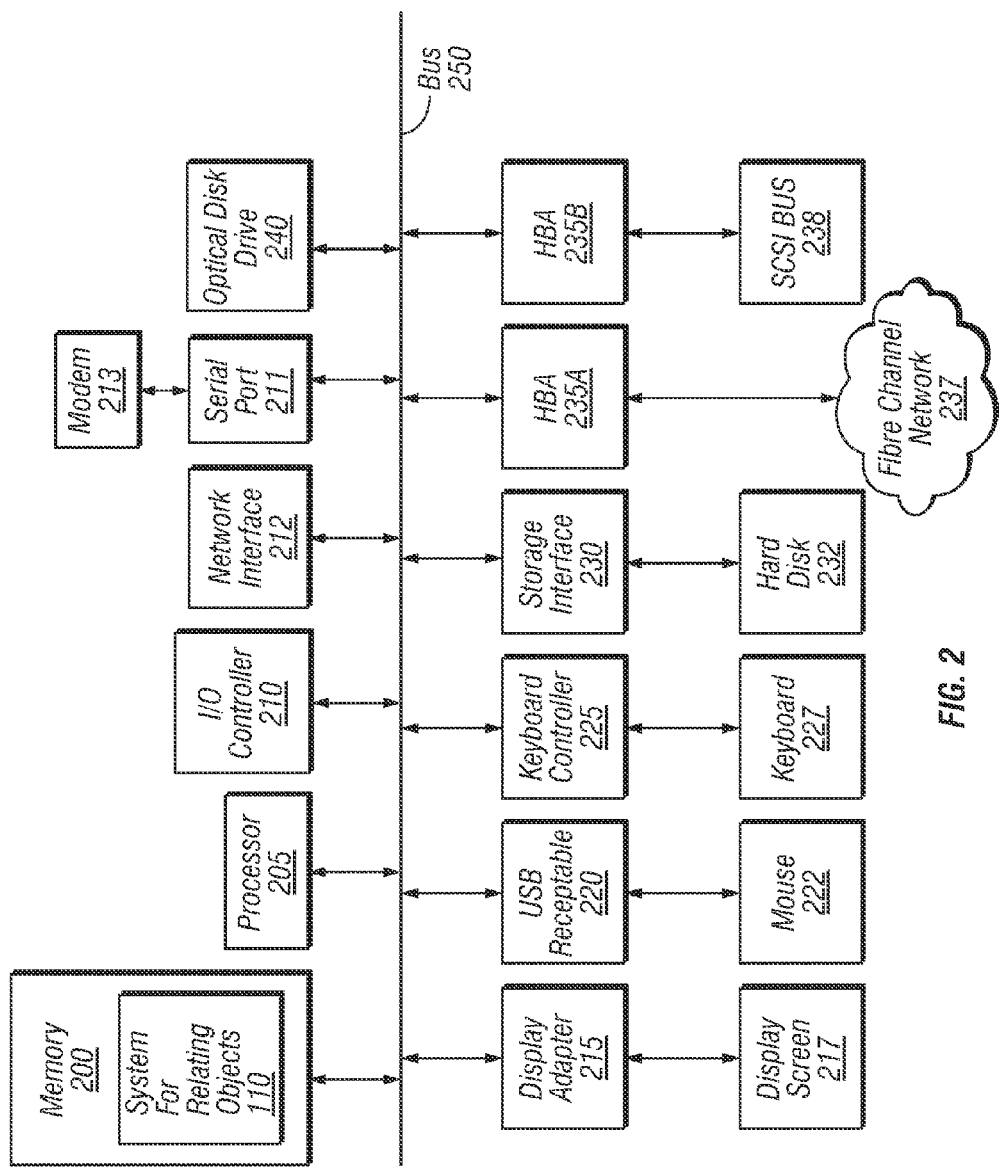
FIG. 2 is an exemplary diagram of client hardware for storing and implementing the system according to one embodiment of the invention.

Clients 100 and servers 110 can be implemented using computer systems, such as the computer that is illustrated in FIG. 2 and described below. The clients 100 and server 105 are communicatively coupled to a network 130, for example via a network interface 210 or a modem 213 as described below in conjunction with FIG. 2. The network 130 can be a wired network, such as a local area network (LAN), a wide area network (WAN), a home network, etc., or a wireless local area network (WLAN), e.g. Wifi, or wireless wide area network (WWAN), e.g. 2G, 3G, 4G.

FIG. 2 is a block diagram of a computer system suitable for implementing a system for relating objects 110 according to the invention. Both the clients 100 and the server 105 can be implemented in the form of such computer systems. As illustrated, one component of the computer system is a bus 250. The bus 250 communicatively couples other components of the computer system, such as a processor 205, system memory 200, an input/output (I/O) controller 210, a display adapter 215, one or more interfaces, such as the storage interface 230 and the network interface 212, a keyboard controller 225, a host bus adapter (HBA) interface card 235A/235B, an optical disk drive 240, a USB receptacle 220, and a serial port 211.

A person of ordinary skill in the art will recognize that a variety of interfaces can be used to attach different devices to the bus. The display adapter 215 connects display devices, such as a display screen 217 to the bus 250. The storage interface 230 communicatively couples at least one hard disk 232 or other forms of magnetic media to the bus 250. The HBA is configured to connect with a Fibre Channel (FC) network 237 (HBA 235A) or a SCSI bus 238 (HBA 235B). The keyboard controller 225 communicatively couples the keyboard 227 to the bus 250. The USB receptacle 220 is used to connect various devices, such as a mouse 222 or other pointing device to the bus.

Other components (not illustrated) may be connected in a similar manner, e.g., document scanners, digital cameras, printers, etc. Conversely, all of the components illustrated in FIG. 2 need not be present. The components can be interconnected in different ways from that shown in FIG. 2.

The bus 250 allows data communication between the processor 205 and the system memory 200, which may include random access memory (RAM), read-only memory (ROM), flash memory, and/or flash memory. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium, e.g., hard disk 232, optical disk and loaded into system memory 200 and executed by the processor 205. Application programs can also be loaded into system memory 200 from a remote location, i.e., a remotely located computer system, for example via the network interface 212 or modem 213. In FIG. 2, the system for relating objects 110 is illustrated as residing in system memory 200. The workings of the system for relating objects 110 are explained in greater detail below in conjunction with the other figures.

Graphical User Interface An exemplary embodiment of the invention is a visualization of relationships between objects, such as celebrities. The relationships displayed for a particular celebrity may indicate, for example: films, television productions, and plays in which the celebrity appears; professionals, such as directors or producers, who have worked with the celebrity; marriages and other personal relationships; children and other relatives of the celebrity; religions, belief systems, and philosophies espoused by the celebrity; establishments frequented by the celebrity, such as restaurants, stores, and hotels; areas, locations, and resorts where the celebrity vacations; charities supported by the celebrity; designer clothes that are favored or worn by the celebrity; and companies, including studios and modeling agencies, for which the celebrity has worked.

Figure 3:
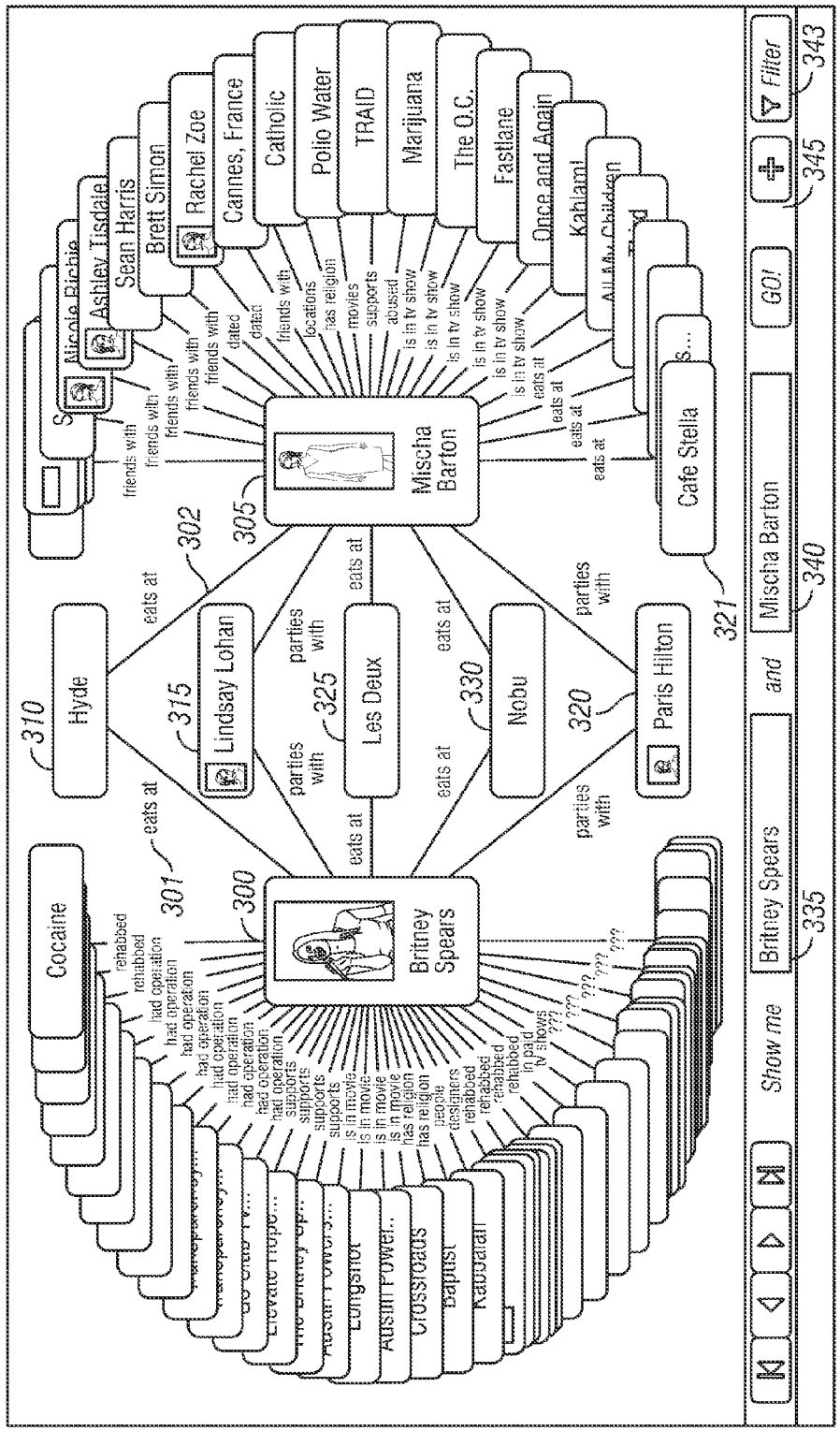
FIG. 3 is a graphical user interface for representing the multiple relationships between objects as a graph according to one embodiment of the invention.

FIG. 3 is a graphical user interface (GUI) for representing the multiple relationships between objects as a graph according to one embodiment of the invention. Each object is depicted as a node 300, 305, 310, 315, 320, 321, 325, 330 in a graph. Relationships between the nodes are depicted as edges 302 connecting the nodes. The label 301 that describes the type of the relationship is located near or as part of the edge 302. For example, Britney Spears 300 is connected to "Hyde" 310 through the relationship "eats at." This is a first-degree relationship because there is a direct connection between the nodes 300 310. Second-degree relationships have an intervening node between the featured objects. For example, Britney Spears 300 is connected to Mischa Barton 305 through many intervening nodes. Specifically, each "parties with" "Lindsay Lohan" 315 and "Paris Hilton" 320, and each "eats at" "Hyde" 310, "Les Deux" 325 and "Nobu" 330.

The system simplifies a visually complex graph by arranging the objects that are related to only one of the featured objects (i.e., objects involved only in first-degree relationships with the featured objects) around the perimeter. For example, the nodes corresponding to objects that are not related to both Britney Spears and Mischa Barton are each arranged in areas around the perimeter of FIG. 3. The nodes around the perimeter can be arranged and ordered, for example, by grouping together all the relationships of type "is in movie" and then ordering those in chronological order. Alternatively, all the nodes that share a relationship with only to Mischa Barton (and not Britney Spears) can be arranged alphabetically (according to relationship type) around the perimeter. A person of ordinary skill in the art will recognize that there are a variety of ways to organize the relationships.

The following nodes and labels are associated with Britney Spears: she "rehabbed" for "Cocaine," "is in movie" "Austin Powers," "is in movie" "Crossroads," "has religion" "Baptist," etc. The following nodes and labels are associated with Mischa Barton: she "is friends with" "Nicole Richie," "Ashley Tisdale," and "Rachel Zoe"; she "dated" "Sean Harris" and "Brett Simon"; one of her "locations" is in "Cannes, France"; she "has religion" "Catholic"; she "supports" "TRAID"; she "abused" "Marijuana"; she was "in the tv show" "The O.C.," "Fastlane," "Once and Again," "Kablam!," and "All My Children"; and she "eats at" "Café Stella." Correspondingly, the second-degree relationships involving both of the featured objects (and an intervening node) are arranged near the center of FIG. 3, between the two featured objects.

The interface can use a variety of different mechanisms for displaying data about particular objects of interest to a user. FIG. 3 shows, for example, two text boxes 335 and 340 for entering the names of celebrities. The filter icon 343 is used to limit the number of objects displayed. For example, a user may only want to one type of relationship (e.g., "dated") or one class of relationships (e.g., "professional" relationships). Alternatively, a user may only want to see particular objects (e.g., restaurants and television shows). The filters are entered either manually or by selection from a preloaded list.

In addition, the "+" icon 345 enables a user to add a new object or a new relationship to the database of information. In this manner, the database is populated as a collaborative effort in which anyone can input objects and create new relationships between objects. In one embodiment, upon creation of a new relationship, the user identifies the source of the supporting information.

Permissions, Review, and Duplicate Prevention

As with any system, there must be some type of monitoring or confirmation system that verifies the accuracy of the data added by a user. For example, the users must register before having permission to input data, an administrator reviews all the information, etc. This helps avoid the introduction of inaccurate information into the system and avoids duplication. In one embodiment, when a user inputs a new relationship, the type of relationship is selected from a preloaded list to avoid redundant relationship types. For example, instead of having one relationship type "is in television show" and another relationship type "appeared in television show" it is only necessary for one of these relationship types to appear in the preloaded list for selection.

Ordered and Collapsed Edges

As noted above, each relationship is characterized by a relationship type indicated by a label applied to the edge representing the relationship. Relationship types may be further assigned to a relationship class incorporating relationships of a similar nature. When multiple relationships that are of the same class are shared between the featured objects, in one embodiment, the user interface orders the edges between the nodes according to an ordering of the relationship types within the class. The ordering may be determined manually or automatically, as in the case of relationships corresponding to a series of chronologically orderable events.

Figure 4:
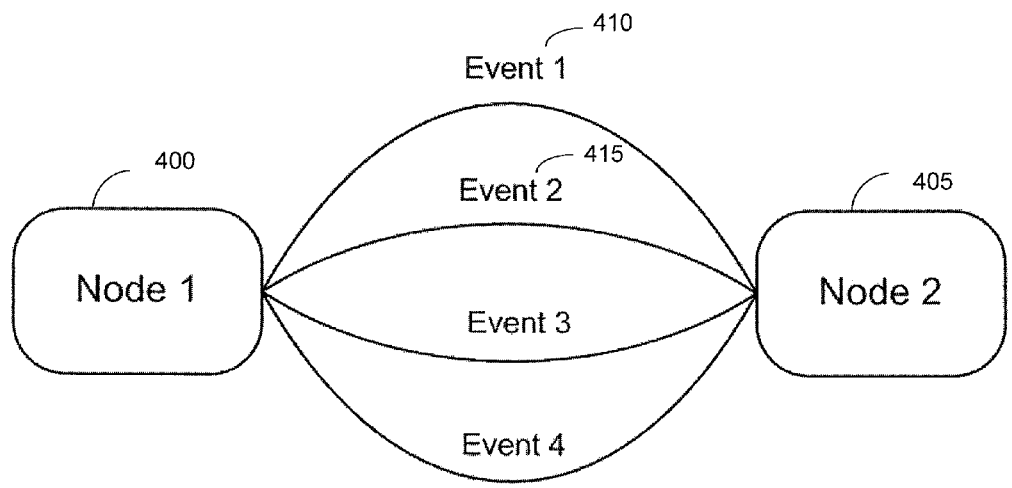
FIG. 4 is a graph that illustrates multiple relationships between two objects as separate edges joining two nodes according to one embodiment of the invention.

For example, one way to organize the relationships between objects in the invention is to place relationships in chronological order. FIG. 4 is a graph that illustrates multiple relationships between two objects as separate edges joining two nodes 400 and 405. In this case, the relationships are in the relationship class "events", with each relationship type corresponding to a particular incident linking the two objects. The edges corresponding to the relationships are therefore labeled as types "Event 1" 410, "Event 2" 415, etc. The edges are arranged in order (e.g., top-to-bottom) based on the chronological ordering of the relationship types within the class (i.e., Event 1 happened before Event 2, etc.).

Figure 5:
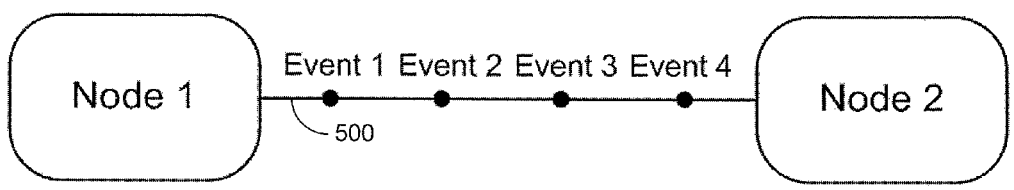
FIG. 5 is a graph that illustrates multiple edges collapsed onto a single line, with each edge marked as a point along the line according to one embodiment of the invention.

The visualization of the relationships between the two objects can be further improved by collapsing the relationships on a single line. FIG. 5 is a graph that illustrates the multiple edges representing the multiple relationships collapsed onto a single line 500, with each relationship marked by a point along the line 500 and ordered according to the chronology of the events.

Figure 6:
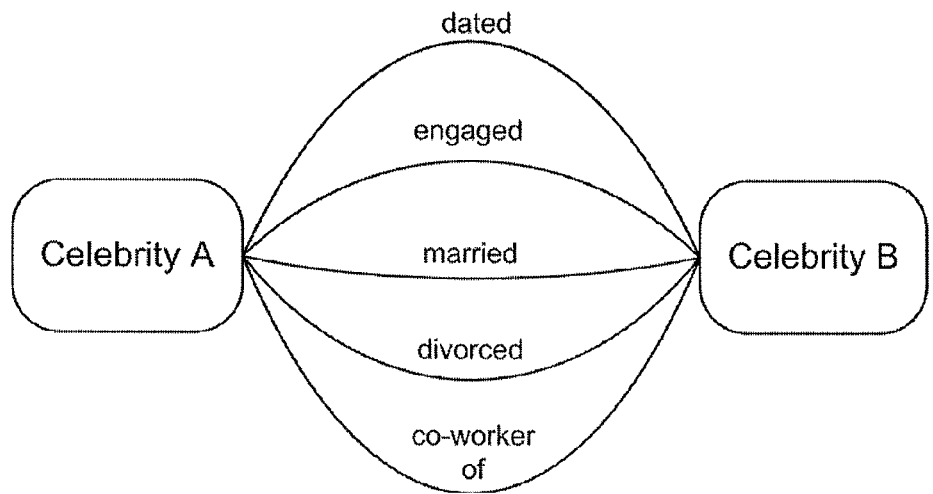
FIG. 6 is a graph that illustrates different types of relationships between two celebrities as separate edges between two nodes according to one embodiment of the invention.

FIG. 6 depicts multiple relationships between two celebrities as separate edges. Here, not all relationships types are within a single class. Celebrity A is related to Celebrity B by several types of relationships in the "personal" class— "dated," "engaged," "married," and "divorced." The celebrities are further related by a relationship of type "co-worker of" in the "professional" class.

Figure 7:
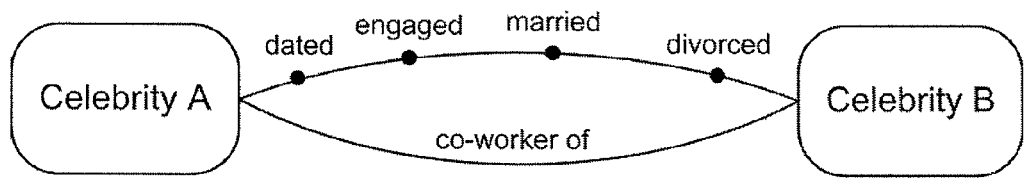
FIG. 7 is a graph that illustrates multiple edges corresponding to relationships within one class collapsed onto a single line and an edge for a relationship within another class according to one embodiment of the invention.

When the relationships in FIG. 6 are collapsed, the types of relationships within a common class are collapsed onto a single line. FIG. 7 is a graph that illustrates a collapsed version of the graph in FIG. 6. The "personal" relationships between the two celebrities are collapsed along a single line. The labels formerly applied to the collapsed edges are applied to the single line according to the ordering of the relationship types within the relationship class. The single relationship within the class "professional," however, remains unmodified.

As noted above and as shown in the above figures, collapsed relationships are labeled on the single line according to an ordering of the relationships types within the relationship class. The ordering may be determined automatically or specified manually by a user. When relationships are ordered automatically, the ordering may be explicitly chronological and determined based on a timestamp associated with the relationship. FIGS. 4 and 5 are examples of relationships in which the ordering is explicitly chronological. In other embodiments, the ordering is implicitly chronological, with the labels applied according to a logical ordering defined for the types within the class. FIGS. 6 and 7 are block diagrams that illustrate examples of relationships where the ordering is implicitly chronological. For example, a person could conclude that a marriage precedes a divorce and that a hiring precedes a firing.

In another embodiment, the ordering of edges that are collapsed onto a single line is specified manually. For example, a user manually orders the labels along a single line by clicking and dragging the labels along the line with a mouse or other pointing device. Alternatively, the ordering of the relationships is entered in a text form. Orderings for future collapse operations may also be specified by the user. For example, the user can modify or extend the logical orderings for a class described above. In one embodiment, the ordering specified for a class need not be the only mechanism for ordering objects. If the types within a class are partially ordered, the edges are collapsed and the labels ordered in conformance with the partial ordering, optionally allowing the remaining labels to be adjusted by the user.

In one embodiment, the spacing of labels along the single line is uniform. Alternatively, in the case of explicitly chronologically ordered labels, the spacing is proportional to the time elapsed between the labels.

The user can toggle off the collapsed rendering of the relationships to restore a visualization in which separate relationships are each assigned a separate edge. For example, a user expands the single line into its component edges by using a mouse to double-click or right-click along the single line.

A user can delete or remove individual labels from the single line. In one embodiment, the user grabs an associated handle and drags it off the end of the single line to either remove the labels from the single line or delete the relationship entirely. If the label is removed from the single line, a single edge for the removed label is restored.

Flow Diagram

Figure 8:
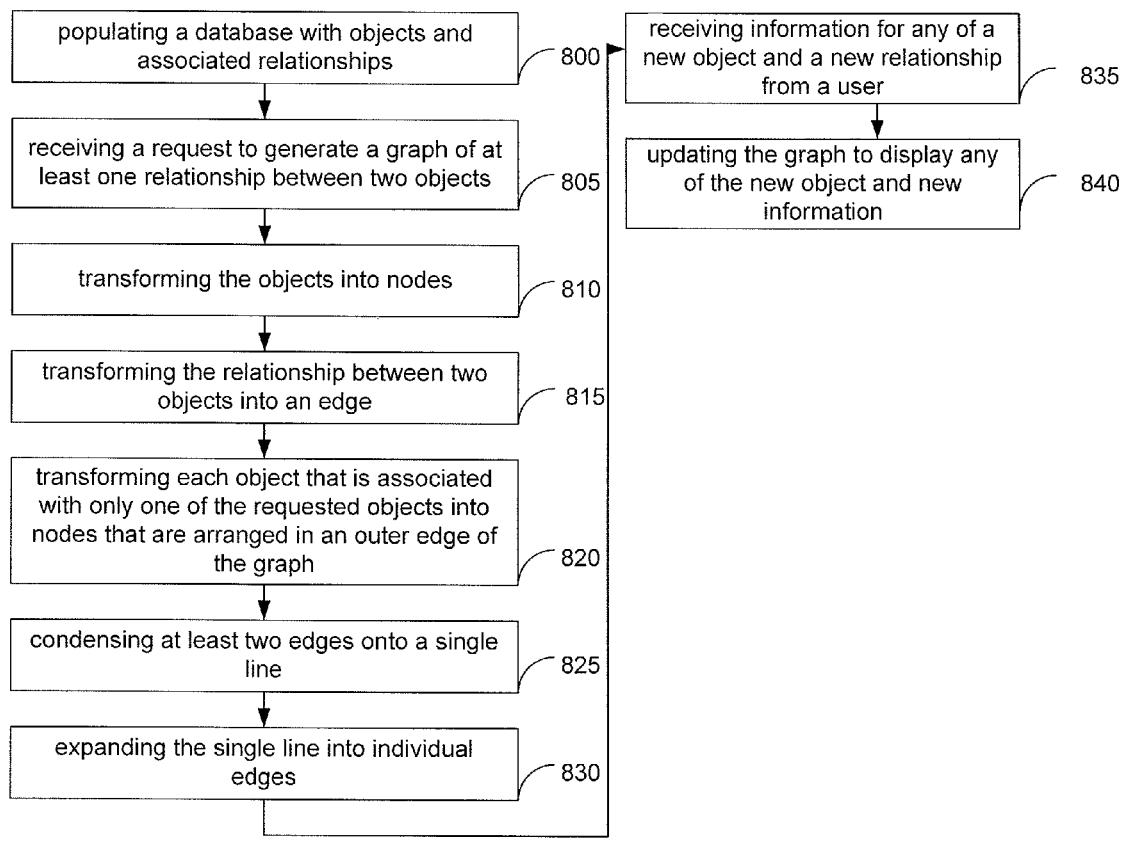
FIG. 8 is a flow chart that illustrates steps for generating a graphical user interface according to one embodiment of the invention.

FIG. 8 is a flow chart that shows the steps for generating a graphical user interface (GUI) according to one embodiment of the invention. A database is populated (800) with objects and the relationships that are associated with the objects. In one embodiment, the database is stored on the same server 105 as the system for relating objects 110. In another embodiment, the database is stored in another location, such as a server (not shown) that is accessible via the network 130.

The system 110 receives (805) a request to generate a graph that displays at least one relationship between at least two objects. The system 110 transforms (810) each object into a node. The system 110 transforms (815) each relationship between the two objects into an edge. Each edge is labeled with the relationship type. The system 110 transforms (820) each object that is associated with only one of the requested objects into nodes that are arranged in an outer edge of the GUI. The system 110 collapses (825) at least two edges onto a single line. The system 110 expands (830) a single line into individual edges. The system 110 receives (835) information about a new object or a new relationship from a user. The system 110 updates (840) the GUI to display the new object as a node or the new relationship as an edge.

As will be understood by those familiar with the art, the invention may be embodied in other specific forms without departing from the spirit or essential characteristics thereof. For example, instead of using celebrities as objects, the graphical user interface could depict other types of relationships, such as the relationships between diseases and treatments for the diseases. Likewise, the particular naming and division of the members, features, attributes, and other aspects are not mandatory or significant, and the mechanisms that implement the invention or its features may have different names, divisions and/or formats. Accordingly, the disclosure of the invention is intended to be illustrative, but not limiting, of the scope of the invention, which is set forth in the following Claims.

The invention claimed is:

1. A computer-implemented method for visualizing relationships between objects, comprising the steps of:

a processor receiving a request to generate a graph that displays at least two relationships between at least two objects;

said processor retrieving the at least two objects from a computer readable storage medium;

said processor transforming the objects into nodes;

said processor transforming a first of the relationships connecting two of the nodes into a first edge;

said processor labeling the first edge with a relationship type of the first relationship;

said processor transforming a second of the relationships connecting two of the nodes into a second edge;

said processor labeling the second edge with a relationship type of the second relationship;
said processor collapsing the first and second edges onto a single line;
said processor applying a label to the single line for each edge that was collapsed onto the single line;
said processor ordering each label applied to the single line along the single line according to an ordering of the relationship types; and
said processor generating a graph that displays a visualization of said ordered labels.

2. A computer-implemented method for visualizing relationships between objects, comprising the steps of:
a processor receiving a request to generate a graph that displays at least two relationships between at least two objects;
said processor retrieving the at least two objects from a computer readable storage medium;
said processor transforming the objects into nodes;
said processor transforming a first of the relationships connecting two of the nodes into a first edge;
said processor labeling the first edge with a relationship type of the first relationship;
said processor transforming a second of the relationships connecting two of the nodes into a second edge;
said processor labeling the second edge with a relationship type of the second relationship;
said processor collapsing the first and second edges onto a single line;
said processor applying a label to the single line for each edge that was collapsed onto the single line;
said processor ordering each label applied to the single line along the single line according to instructions received from a user; and
said processor generating a graph that displays a visualization of said ordered labels.

3. A computer-implemented method for visualizing relationships between objects, comprising the steps of:
a processor receiving a request to generate a graph that displays at least two relationships between at least two objects;
said processor retrieving the at least two objects from a computer readable storage medium;
said processor transforming the objects into nodes;
said processor transforming a first of the relationships connecting two of the nodes into a first edge;
said processor labeling the first edge with a relationship type of the first relationship;
said processor transforming a second of the relationships connecting two of the nodes into a second edge;
said processor labeling the second edge with a relationship type of the second relationship;
said processor collapsing the first and second edges onto a single line;
said processor applying a label to the single line for each edge that was collapsed onto the single line;
said processor grouping each of the relationship types within a relationship class;
said processor collapsing all edges with the same relationship class onto a single line;
said processor ordering each label applied to the single line along the single line according to an ordering of the relationship types within the relationship class; and
said processor generating a graph that displays a visualization of said ordered labels.

4. A computer-implemented method for visualizing relationships between objects, comprising the steps of:
a processor receiving a request to generate a graph that displays at least two relationships between at least two objects;
said processor retrieving the at least two objects from a computer readable storage medium;
said processor transforming the objects into nodes;
said processor transforming a first of the relationships connecting two of the nodes into a first edge;
said processor labeling the first edge with a relationship type of the first relationship;
said processor transforming a second of the relationships connecting two of the nodes into a second edge;
said processor labeling the second edge with a relationship type of the second relationship;
said processor ordering the first and second edges according to an ordering of the first and second relationship types; and
said processor generating a graph that displays a visualization of said ordered edges between said at least two objects.

5. The method of claim 4, wherein the ordering of the first and second relationship types is an ordering within a relationship class.

6. A computer program product for generating a graph that displays at least two relationships between objects comprising a non-transitory computer-readable storage medium storing program code which, when executed by a processor, performs the following steps:
said processor retrieving at least two objects from a computer-readable storage medium;
said processor transforming the objects into nodes;
said processor transforming a first relationship connecting two of the nodes into a first edge;
said processor labeling the first edge with a relationship type of the first relationship;
said processor transforming a second relationship connecting two of the nodes into a second edge;
said processor labeling the second edge with a relationship type of the second relationship;
said processor collapsing a plurality of edges onto a single line;
said processor applying a label to the single line for each edge that was collapsed onto the single line;
said processor ordering each label applied to the single line along the single line according to an ordering of the relationship types; and
said processor generating a graph that displays a visualization of said ordered labels.

7. A computer program product for generating a graph that displays at least two relationships between objects comprising a non-transitory computer-readable storage medium storing program code which, when executed by a processor, performs the following steps:
said processor retrieving at least two objects from a computer-readable storage medium;
said processor transforming the objects into nodes;
said processor transforming a first relationship connecting two of the nodes into a first edge;
said processor labeling the first edge with a relationship type of the first relationship;
said processor transforming a second relationship connecting two of the nodes into a second edge;
said processor labeling the second edge with a relationship type of the second relationship;
said processor ordering each of the first and second edges according to an ordering of the relationship types; and said processor generating a graph that displays a visualization of said ordered edges between said at least two objects.

8. The computer program product of claim 7, wherein the ordering of the relationship types is an ordering within a relationship class.

\* \* \* \* \*